United States Patent [19]

Brauer

[11] Patent Number: 5,358,664
[45] Date of Patent: Oct. 25, 1994

[54] GELLED OIL COMPOSITIONS

[75] Inventor: Melvin Brauer, East Brunswick, N.J.

[73] Assignee: Caschem, Inc., Bayonne, N.J.

[21] Appl. No.: 961,233

[22] Filed: Oct. 15, 1992

[51] Int. Cl.$^5$ .................... B01J 13/00; C10M 117/10; G02B 6/44
[52] U.S. Cl. ................................ 252/315.4; 252/37.5; 252/37.7; 385/84; 385/100; 385/109
[58] Field of Search ................ 252/315.4, 37.5, 37.7; 385/66, 84, 100

[56] References Cited

U.S. PATENT DOCUMENTS

| | | | |
|---|---|---|---|
| 2,252,087 | 8/1941 | McNab et al. | 252/37.5 X |
| 2,491,641 | 12/1949 | Bondi | 252/315.4 X |
| 3,345,291 | 10/1967 | Koundakjian | 252/37.7 |
| 3,776,846 | 12/1973 | Bailey et al. | 252/37.7 X |
| 3,791,972 | 2/1974 | Myers | 252/37.7 |
| 3,939,082 | 2/1976 | Williams et al. | 252/32.7 E |
| 4,324,453 | 4/1982 | Patel | 350/96.23 |
| 4,370,023 | 1/1983 | Lange et al. | 350/96.23 |
| 4,701,016 | 10/1987 | Gartside, III et al. | 350/96.23 |
| 4,709,982 | 12/1987 | Corne et al. | 350/96.23 |
| 4,711,523 | 12/1987 | Iri et al. | 350/96.23 |
| 4,787,703 | 11/1988 | Tomko et al. | 350/96.23 |
| 4,810,395 | 3/1989 | Levy et al. | 252/315.4 X |
| 4,989,451 | 2/1990 | Story | 350/96.23 |
| 4,997,720 | 3/1991 | Bourbonais et al. | 428/900 |
| 5,050,959 | 9/1991 | Randisi | 385/100 |

FOREIGN PATENT DOCUMENTS 145609 6/1991 Japan .
196104 8/1991 Japan .

OTHER PUBLICATIONS

Vincent, John E., "Chemistry of Aluminum-Organics in the Preparation of Ink Vehicles and Gel Varnishes", American Ink Maker, Oct. 1984, pp. 25-35.
Samman, Nicholas, "Chemistry of Aluminum Complex Grease Revisited", NLGI, Oct. 27-30, 1991.
Kruschwitz et al., "The Development of Formulations for Aluminum Complex Thickener Systems", NLGI, May 1976, vol. 40, pp. 51-59.
Hamnelid et al., "Amazing Grease or Finding the Right Way to Consistency", NLGI, Nov. 1991, vol. 55:8, pp. 11-299-20-308.
Kruschwitz, H. W., "Thickener Systems for Aluminum Complex Greases", Rhone-Poulenc.

Primary Examiner—Richard D. Lovering
Attorney, Agent, or Firm—Pennie & Edmonds

[57] ABSTRACT

The invention generally relates to gelled oil compositions which employ aluminum complex soaps as gelling agents. The gelled oils comprise an oil component, a bleed inhibitor of polybutene, and optional amounts of antioxidant and pour point depressant. The gelled oils are particularly suited for use as buffer tube gels and as filling compounds for waveguides.

24 Claims, No Drawings

GELLED OIL COMPOSITIONS

FIELD OF THE INVENTION

This invention generally relates to gelled-oil filling compositions. More particularly, the invention relates to gelled-oil compositions which include aluminum complex based soaps. The invention also relates to optical cables which employ these compositions.

BACKGROUND OF THE INVENTION

Increasingly, in technologies which employ beams of light for transmission of data, or for other communications, fiber optics are being employed. Since the fiber optic element is fragile, one or more fiber optic elements are placed into a bundle which is inserted into a protective buffer tube such as a polyethylene jacket.

The fiber optic elements, however, cannot be allowed to remain loose in a buffer tube. If such were permitted, then almost any kind of mechanical shock or bending could result in damage to or breakage of the fiber optic element. In view of the substantial length of many of the presently used fiber optic elements in data transmission cables, replacement or repair of the fiber optic elements would be both difficult and expensive. Accordingly, means must be provided for cushioning of the fiber optic elements within the buffer tube.

In providing lubrication for or cushioning of the fiber optic elements carried in the buffer tube, care must be taken to assure that the optical qualities of the fiber optic elements are not diminished. Thus, in formulating a filling composition such as a gelled-oil for use with fiber optic elements carried in a buffer tube, the gelled-oil must provide not only lubrication or cushioning, but also must not deleteriously affect the optical qualities of the fiber optic element. Moreover, the gelled oil must not attack the buffer tube or cable housing.

The requirements of gelled oils useful as buffer tube gels and filling compounds for optical cables are not easily satisfied. The gelled oil compounds must remain stable throughout the temperature range of use of the cable, which should extend at least from $-40°$ to $+70°$ C. If the cable is subjected to temperatures higher than the working temperature range but not so high as to injure any of the components of the cable, the filling compounds must be fluid enough for the cable to be formed and completely filled with the compound without risk of breaking or over-stressing the optical fibers.

The gelled oils also should be cohesive enough to ensure that bending of the cable at a radius of a few decimeters or less will not result in the formation of voids in either the interior or surface of the compound. Also, the gelled oils should be soft enough to allow such bending without subjecting the optical fibre elements to any significant strain (since strain causes signal attenuation) but yet resist flow under gravity as well as the hydrostatic pressures likely to be applied to the cable if one of its ends is exposed in a flooded manhole.

It is known in the art that gelling agents such as clays and hydrophobic fumed silica may be employed to provide gelled oil formulations. Hydrophobic fumed silica, however, is expensive since relatively large amounts of fumed silica must be used to provide useful gels. Use of hydrophobic fumed silicas, moreover, causes the resulting gels to be highly abrasive.

A need therefore exists for gelled oil formulations and greases which have improved lubricating properties and which avoid the abrasiveness of silica based gel formulations.

SUMMARY OF THE INVENTION

The invention generally relates to gelled oil compositions. The gelled oils comprise a hydrocarbon oil, a bleed inhibitor, an aluminum-complex soap, as well as optional antioxidants and pour point depressants. The gelled oils are particularly suited for use as buffer tube gels and as filling compounds for waveguides.

In accordance with the invention gelled oil compositions having particular utility as buffer tube gels and as filling compounds in waveguides is provided. The gelled oil compositions include an oil component such as a hydrocarbon oil, one or more bleed inhibitors, and an aluminum soap complex. The gelled oils optionally may include antioxidants and pour point depressants. The oil component can be at least one of either a mineral oil, preferably a food grade mineral oil, a napthenic oil, a paraffinic oil, or a polyalphaolefin oil. The gelled oil compositions comprise 40–90% preferably 50–75% of the oil component 5–50% preferably 25–45% of bleed inhibitor, and 4–15%, preferably 6 to 8% of an aluminum soap complex of a fatty acid and an aromatic acid. Fatty acids for manufacture of the aluminum soap complexes can include at least one of stearic acid, oleic acid, myristic acid, capric acid, and palmitic acid. Useful bleed inhibitors include block copolymers such as rubber compounds and hydrocarbons of less than 10 carbon atoms which have been polymerized into an oil, and which have an aromatic content of less than 6%. Useful rubber compounds include butyl rubber, ethylene-propylene rubber, ethylene-propylene-dimer rubber, chlorinated rubber, and thermoplastic rubber block copolymers. Preferably, mixtures of block copolymers and polymerized oils are employed as bleed inhibitors. The optional anti-oxidants may be present in an amount of 0.1–2% by weight. Preferably, the anti-oxidant includes a sterically hindered phenolic compound that includes a sulfur linkage.

The gelled oil compositions of the invention have improved lubricating properties and less abrasiveness than silica based competitive products. Moreover, the gelled oils of the invention can achieve the same viscosity as formulations based on silica but with surprisingly lower amounts of gelling agent.

Gel compositions which are particularly useful as buffer tube gels includes 20–90% of an oil such as mineral oil and 5–50% of bleed inhibitor where the weight ratio of mineral oil to bleed inhibitor is 7:3-1:1, the mole ratio of fatty acid to aromatic acid in the aluminum soap complex is about 1:1, and the mole ratio aluminum:-(fatty acid + aromatic acid) in the aluminum soap complex is about 1:2.

The gelled oil compositions of the invention, in addition to utility as filler compounds and buffer tube gel compounds for optical waves, and also can be used as encapsulants for telecommunication devices such as terminal blocks and as lubricants in steel mold release compositions.

Having briefly summarized the invention, the invention will now be described in detail by reference to the following specification and non-limiting examples. Unless otherwise specified, all percentages are by weight and all temperatures are in degrees Celsius.

DETAILED DESCRIPTION OF INVENTION

Generally, the gelled oil compositions of the invention include an oil component, an aluminum soap complex, a bleed inhibitor, and optional amounts of pour point depressant and antioxidant. The oil component may be about 40–90%, preferably 50–75% by weight of the composition; the bleed inhibitor may be about 5–50%, preferably 25–45%; the aluminum soap complex may be about 4–15%, preferably 5–9%, most preferably 6–8% of the composition. The optional pour point depressant may be about 0.5–10%, preferably 1–3%, and the optional antioxidant may be about 0.1–2%, preferably 0.5–1.5% of the composition.

Generally, the gelled oils of the invention are produced by forming an aluminum soap complex in-situ in the presence of the oil component. The oil component includes one or more bleed inhibitors as well as optional antioxidants and pour point depressants.

The oil component of the gelled oil compositions can be a hydrocarbon oil such as a mineral oil, an alpha olefin of ten carbon atoms or less which has been polymerized into an oil, a napthenic oil, or a paraffinic oil. Preferably, the oil component is a mineral oil, most preferably a food grade mineral oil. Particularly useful hydrocarbon oils have an aniline point above 220° F., a flash point of at least 350° F., preferably 500° F., a viscosity of 65–600 Sabolt Universal Seconds ("SUS") at 100° F., preferably 530 SUS, and an average number molecular weight of at least 300, preferably greater than 400.

For the purpose of this disclosure, the following terms have the following meanings:

(a) "Paraffinic mineral oil" means a mineral oil having a viscosity-gravity constant, as determined by the procedure specified in the American Society of Testing Materials (ASTM) D 2501-67 procedure, between 0.78 and 0.85 inclusive with a minimum of 65 percent paraffinic carbon atoms and a maximum of 5 weight percent aromatic carbon atoms.

(b) "Naphthenic mineral oil" means a mineral oil having a viscosity-gravity constant, as determined by the procedure specified in the American Society of Testing Materials D 2501-67 procedure, between 0.78 and 0.85 inclusive with a minimum of 35 percent naphthenic carbon atoms and a maximum of 5 percent aromatic carbon atoms.

Mineral oils useful in the gelled oils of the invention generally include but are not limited to transformer oil, spindle oil, cable insulating oil and machine oil. Useful napthenic oils include but are not limited to Drakeol 35, available from Pennreco Company, Telura oils such as Telura 309 and Coastal Pale Oils from Exxon. Useful paraffinic oils include but are not limited to Pale 100, and Telura oils such as Telura 607, all of which are available from Exxon.

In accordance with the invention, the aluminum soap complexes can be readily adjusted to serve as effective gelling agents for a wide variety of oils. Typically, the composition of the aluminum soap complex is varied by control of the fatty acid and aromatic acid components depending on the aniline point of the oil component. The formulation variables of the soap complex include the molar ratio of aromatic acid to fatty acid, the carbon chain length of the fatty acid, and the molar ratio of total acids (fatty and aromatic) to aluminum. The fatty acid:aromatic acid mole ratio generally is from about 1.4:0.6 to 0.6:1.4, and preferably 1:1. The total acids:aluminum ratio is about 1.8:1–2.2:1, preferably 1.9:1 to 2.1:1 and most preferably 2:1.

As is known in the art, aluminum soap complexes are formed by reacting an organo-aluminumoxy compound with a fatty acid and an aromatic acid. The soaps may be formed in-situ in the presence of the oil component, or may be preformed and added to the oil component. Preferably, the aluminum soap complexes are formed in-situ in the presence of the oil component by reacting one mole of stearic acid, one mole of benzoic acid, and a tri-aluminum tri-alkoxide in the presence of a high aniline point mineral oil, especially mineral oils such as Drakeol 500 available from Pennreco.

A variety of fatty acids may be employed to form the aluminum soap complexes employed in the invention. Generally, these acids are of animal origin, or from vegetable matter or marine life. Fatty acids which can be employed to provide useful aluminum soap complexes include but are not limited to fatty acids with chain lengths of $C_8$–$C_{22}$. Preferably, the fatty acid chain length is $C_{12}$ to $C_{22}$, most preferably $C_{14}$–$C_{18}$. Useful fatty acids are exemplified but are not limited to stearic acid, myristic acid, capric acid, oleic acid and palmitic acid as well as mixtures of these acids. Rubber grade stearic fatty acids and simple tallow fatty acids, unhydrogenated, also may be used.

The amount of unsaturation in the fatty acid employed to form the aluminum soap complexes also may vary. Typically, the degree of unsaturation, measured in terms of iodine value, is 0.5 but it can be as much as 10 to 12.

The aluminum component employed to produce the aluminum soap complexes typically is provided in the form of an alkoxide, preferably isopropoxide or trimers thereof. Other useful sources of the aluminum component may be provided as oxyaluminum acylates such as oxy aluminum octoate, and aluminum alkoxide chelates such as ketalin (available from Chattem Chemicals).

The aluminum soap complexes which are useful as gelling agents in the invention may be employed in admixture with metallic soaps of alkaline and alkaline earth metals such as Na, Ca, Li, Ba, Sr, Zn, Pb, Cd, K and like metals. Additional thickeners and gelling agents may be combined with the aluminum soap complexes. Useful additional thickeners and gelling agents include bentonite, silica and phthalocyanine; polyureas such as those having 2 to 20 urea bonds and a molecular weight of 100 to 5,000; amino acid-type oil gelling agents such as N-lauroyl-L-glutamic acid-$\alpha,\beta$-di n-butyramide; cellulose derivatives such as quaternary ammonium salt of cellulose and fatty acid esters of dextrin and the like.

The amount of the aluminum soap complexes can be employed as gelling agents vary over a wide range of weight percents. However, if the amount of aluminum soap complex is excessive, the viscosity and yield point of the resulting gelled oil formulation may become excessive.

The bleed inhibitors employed in the gelled oils can be synthetic hydrocarbon oils or block copolymers, as well as mixtures thereof, preferably mixtures. Low molecular weight synthetic oils are particularly desirable as bleed inhibitors. Useful synthetic oils included but are not limited to $\alpha$-olefin oligomers of $C_2$–$C_9$ alkenes such as polybutene, polyisoprene, polyhexene, polyheptene, polyoctene, polynonene and the like. Most preferably, the bleed inhibitor is polybutene.

Examples of polymers useful as bleed inhibitors include ethylene/propylene rubber, styrene-butadiene rubber copolymers, styrene-ethylene/propylene rubber copolymers, styrene-ethylene/butylene-styrene block copolymers, styrene-isoprene-styrene block copolymers and, preferably, styrene-ethylene/propylene block copolymers. Preferably, the block copolymer is present in an amount of 0.5–10% by weight of the composition.

Among the preferred block copolymers that can advantageously be used as bleed inhibitors in the invention are styrene-rubber block copolymers. Exemplary block copolymers are linear block copolymers such as those which have styrene-rubber and styrene-rubber-styrene, radial block polymers of the formula (styrene-rubber)$_n$ where n typically is 3–4. Useful rubbers in these copolymers include but are not limited to isoprene, butadiene, ethylene/propylene, and mixtures thereof. These copolymers typically have a styrene:rubber ratio between approximately 1:9–1:1. Especially preferred block copolymers are styrene-ethylene/propylene block copolymers having a styrene:rubber ratio of about 0.37:0.63, unplasticized, specific gravity about 0.93, break strength (ASTM D-412) 300 psi, available from Shell Chemical Co. under the trade designation Kraton G 1701.

Pour point depressants useful in the gelled oils of the invention include Hitek 672, available from Ethyl Corp. The pour point depressants may form about 0.1–2% by weight of the gelled oil. Antioxidants useful in the gelled oils include sterically hindered phenolic compounds which have sulfur linkages. The antioxidants can be employed in an amount of 0.1–2% by weight of the gelled oil. The specific percentages of these components may vary depending on the intended application of the gelled oil.

As mentioned, the compositions of the aluminum soap complex can be tailored over a wide range to provide gelling agents which can be used with a much greater variety of oil compositions than is possible with the prior art silica based gelling agents. For example, the aluminum soap complexes can be tailored to achieve specific viscosities within the gelled oil by varying the chain length of the fatty acid employed to produce the aluminum soap complex. By reducing the chain length of the fatty acid employed to produce the aluminum soap complex, the viscosity of the gelled oil substantially can be decreased.

In gelled oil formulations particularly useful as buffer tube gels and as cable filling compounds, the aluminum soap complex preferably is formed in situ by reaction of one mole of aluminum from aluminum compounds such as oxyaluminum acylates, aluminum alkoxide chelates and aluminum alkoxides or trimers thereof, with 1 mole of stearic acid and 1 mole of benzoic acid in the presence of the oil component. A high aniline point oil, preferably a food grade mineral oil, is used to provide buffer tube gels. Oils which have an aromatic content of 0–11%, a napthenic content of 31–46%, and a paraffinic content of 51–65% are employed in cable filling compositions. A bleed inhibitor, and optional amounts of pour point depressant and antioxidant may be included.

Examples of suitable oils useful in manufacture of cable filling compounds include but are not limited to Puremore #WOT 14, Poly-XH51, and Poly X-M51P, all of which are available from Burmah-Castrol PLc, and Edelex 27 available from Shell U.K. Ltd. The aluminum soap complexes employed to provide cable filling compounds can be 4–30% of the gelled oil composition. The aluminum soap complexes have an aluminum to total acids mole ratio of 1:2.1–1:1.9, and a fatty acid-:aromatic acid ratio of 1.3:0.7–0.7:1.3, preferably 0.9:1.1–1.1:0.9. The bleed inhibitor may be one or more of synthetic elastomers such as a styrene-butadiene block copolymer and a synthetic oil such as polybutene. Preferably, oil components useful as buffer tube gels have viscosities of at least 150 cps at 25° C. Preferably the mineral oil and polybutene are employed in a weight ratio of 6:4.

Gelled oil compositions particularly useful in buffer tube gel applications are formulated with 54–56% of oil component of mineral oil (food grade)such as Drakeol 500 available from Pennreco, 6–7% of the aluminum soap complex, 34 to 36% of a bleed inhibitor of a polybutene such as Soltex PB32 available from Soltex Co., or Amoco H-300 available from Amoco Co. as well 1% of an antioxidant such as Irganox 1035 available from Ciba Geigy, and 1 to 2% of a bleed inhibitor such as Kraton G-1701 available from Shell Oil Co., and 0.2% of a pour point depressant. The aluminum soap complexes employed in the buffer tube gelled oil formulations preferably have a fatty acid to aromatic acid ratio of 1:1 and a ratio of total acids (fatty+aromatic) to aluminum of 2.1. Useful aromatic acids include benzoic acid, p-toluic acid, o-toluic acid, 2-chlorobenzoic acid, α-naphthoic acid, β-naphthoic acid, 9-phenanthroic acid, 3-phenanthroic acid, anthraquinone-α-carboxylic acid, anthraquinone-β-carboxylic acid and dehydroabietic acid.

EXAMPLE 1

259.95 grams of Drakeol 500, 173.3 grams of polybutene 32 and 10 grams Kraton G 1701 are charged to a resin flask equipped with a heating mantle, a stirrer, a dropping funnel, a nitrogen inlet and a gas outlet tube. Nitrogen gas is admitted to the flask and 22.74 grams of stearic acid (acid number 205.60) is added. The resulting mixture is stirred while heating to a temperature of 100° C. 9 grams of tri-aluminum-tri-isopropoxide (12.5% Al) is added dropwise. 10 grams of benzoic acid is added, the temperature increased to 124° C., and an additional 9 grams of tri-aluminum-tri-isopropoxide is added dropwise. The temperature is further increased to 190° C. over 49 minutes. The temperature is maintained for eight minutes while stirring under nitrogen. The mixture is cooled to 130° C. over a 17 minute period. Five grams of Irganox 1035 (available from Ciba-Geigy) anti-oxidant and 1 gram of Hitek 672 pour point depressant is added. The resulting mixture is cooled to room temperature over night to yield a gelled product.

EXAMPLE 2

The procedure of example 1 is followed except that Kraton G1701 is not employed.

EXAMPLE 3

The procedure of example 1 is followed except that polybutene 32 is not employed.

EXAMPLE 4

The procedure of example 1 is followed except that both polybutene 32 and Kraton G1701 are not employed.

EXAMPLE 5

254.43 grams of Drakeol 500 oil, 169.62 grams of polybutene 32, 10 grams of Kraton G1701, 7.59 grams of stearic acid of acid number 205.60, and 42.38 grams of Kolate 6054 (5.3% aluminum), available from Rhone-Poulenc, are charged to a resin flask equipped as in example 1. Nitrogen gas is admitted and the temperature is raised to 100° C. Benzoic acid (9.99) grams is added and the temperature is raised to 125° C. and maintained for 20 minutes. Thereafter, the temperature is raised to 190° C. over a period of 49 minutes. The temperature is maintained for eight minutes while stirring under nitrogen. The mixture then is cooled to 130° C. over a 17 minute period. 5 grams of Irganox 1035, 1 gram of Hitek 672 pour point depressant than is added. The resulting mixture is cooled to room temperature over night to yield a gelled product.

cooled to 130° C. over 17 minutes. Five grams of Irganox 1035 and 1 gram Hitek 672 is added. The resulting mixture is cooled over night to yield a gelled product.

The properties of the gel formulations formed by these examples are summarized in Table I below:

TABLE I

| EXAMPLE | TOTAL ACID: AL MOLE RATIO | ALUMINUM SOURCE | % SOAP | OIL/PB[1] | % RUBBER BLEED INHIBITOR | (%) BLEED 65 C | VISC. (CPS)[3] | FA/BA[4] | RELAXATION TIME SEC. | YIELD POINT (Pa) |
|---|---|---|---|---|---|---|---|---|---|---|
| 1 | 2 | Tri-aluminum-tri-isopropoxide | 7 | 60/40 | 2 | 0.4 | 39,100 | 1/1 | 105 | 8 |
| 2 | 2 | Tri-aluminum-tri-isopropoxide | 7 | 60/40 | 0 | 12.0 | 24,700 | 1/1 | 501 | 5 |
| 3 | 2 | Tri-aluminum-tri-isopropoxide | 7 | 100/0 | 2 | 3.2 | 28,200 | 1/1 | 618 | 11 |
| 4 | .2 | Tri-aluminum-tri-isopropoxide | 7 | 100/0 | 0 | 17.7 | 23,600 | 1/1 | 501 | 38 |
| 5 | 2 | Kolate 6054 | 7 | 60/40 | 2 | 0.8 | 40,200 | 1/1 | 474 | 9 |
| 6 | 2 | Tri-aluminum-tri-isopropoxide | 7 | 60/40 | 2 | 2 | 22,350 | 1/1 | 2 | 1 |
| 7 | 2 | Tri-aluminum-tri-isopropoxide | 6 | 60/40 | 1 | 4.8 | 22,366 | 1/1 | 294 | 5 |

[1]PB = polybutene 32
[2]Kraton G 1701
[3]Shear rate = 20/sec.$^{-1}$
[4]FA = Fatty Acid, BA = Benzoic Acid

EXAMPLE 6

258.81 grams of Drakeol 500, 172.54 grams polybutene 32, and 10 grams of Kraton G1701 are charged to a resin flash equipped as in Example 1. Nitrogen gas is admitted to the flask and 21.26 grams myristic acid (acid number=246.50) is added. The resulting mixture is stirred while heating to a temperature of 100° C. 10.09 grams of tri-aluminum, tri-isoproproxide (12.5% Al) is added dropwise. 11.22 grams of benzoic acid is added, temperature increased to 124° C. and an additional 10.09 grams of the tri-aluminum-tri-isoproproxide is added dropwise. The temperature further is increased to 190° C. over 49 minutes. The temperature is maintained for 8 minutes while stirring under nitrogen. The mixture is cooled to 130° C. over 17 minutes. Five grams of Irganox 1035 and 1 gram Hitek 672 is added. The resulting mixture is cooled over night to yield a gelled product.

EXAMPLE 7

267.30 grams of Drakeol 500, 178.20 grams of polybutene-32, and 5 grams of Kraton G1701 are charged to a resin flask equipped as in Example 1. Nitrogen is admitted to the flask and 19.49 grams of stearic acid (acid number=205.60) is added. The resulting mixture is stirred while heating to a temperature of 100° C. 7.72 grams of tri-aluminum-tri-isoproproxide (12.5% AL) is added dropwise. 8.58 grams of benzoic acid is added, temperature increased to 124° C., and an additional 7.72 grams of the aluminum-tri-isoproproxide is added dropwise. The temperature further is increased to 190° C. over 49 minutes. The temperatures is maintained for 8 minutes while stirring under nitrogen. The mixture is The effect of varying the fatty acid component of the aluminum soap complex on the viscosity of the gelled oil is shown in Table I above. In Table I, the fatty acid:-benzoic acid mole ratio is 1 and the total acids to aluminum mole ratio is 2. The ratio of the oil component to the polybutene bleed inhibitor is 6:4.

As shown in Table I, it was surprising that, in Example 6 as compared to Examples 1 and 5, a reduction in chain length of a fatty acid dominates the tendency toward higher viscosities that occur due to increased soap content and/or increased amounts of bleed inhibitors. Example 6 also illustrates the unexpected finding that a small reduction in chain length dramatically reduces yield point and relation time of the gelled oil.

In the above examples, viscosity is determined on a Brookfield Cone and Plate Viscometer Model DV-II, in accordance with the operating instructions for that viscometer at a shear rate of 20 reciprocal seconds. The yield point is estimated by measuring the storage modulus (G'), at a frequency of 1 Hertz, as a function of strain on a Bohlin VOR rheometer. From the values of G' versus strain, the critical strain (the strain, which if exceeded, yields a decrease in G') is calculated by methods known in the art. The yield point is estimated by multiplying the critical strain by the average value of G' for strain values less than the critical strain.

Relaxation time is determined by measuring the stress relaxation of the gel on the Bohlin VOR rheometer at a strain less than the critical strain as defined above. In these tests, the frequency is 1 Hertz. During the test, the storage modulus $G^1$ is monitored as a function of time. The relaxation time is the time at which $G^1$ reaches the value:

$$\left( \frac{G^1_{initial}}{e} \right)$$

The paper bleeding test is described as follows:
MATERIALS
1. 5 ml syringe 2. 11 cm diameter, type 1 filter paper
3. Pyrex watchglass (12 cm diameter)
4. 600 ml Pyrex beaker
5. Lab spatula
6. Analytical balance
7. Tweezers
8. Scissors
9. Forced draft oven set to 65° C.

PROCEDURE

1. Load the grease compound into the syringe with a spatula. Slowly press the plunger to eliminate air bubbles.
2. Cut a 1 in. by 1 in. filter paper square; weight (WT 1) and record (to 0.0001 grams).
3. Slowly apply 1 ml of the compound from the syringe onto the filter paper square in a circular dab. (Leave some room around the edges to allow the dab to spread.) Weigh this "sample square" and record this value as WT 2.
4. Weigh an 11 cm diameter filter paper circle (WT 3), and place it on the watchglass. Put the "sample square" on the center of the filter paper, and cover with a 600 ml beaker.
5. Let the sample lie undisturbed at room temperature for 16 hours.
6. Weigh the sample square (WT 2A) and the large filter paper circle (WT 3A).
7. Replace the sample square under the beaker, and place the entire assembly in the oven. Do not disturb for 24 hours.
8. Remove from the oven and allow to cool for 5 minutes on a marble surface. Weigh the sample square (WT 2B) and the filter paper circle (WT 3B). Note any color changes.
9. Discard sample square and filter paper.
10. When handling the sample square and the filter paper circle, use only tweezers. Take care to keep moisture and all foreign particles away from the sample square.

CALCULATIONS

1. Initial Weight=(WT 2)−(WT 1)
2. Weight Loss=(WT 2)−(WT 2A or WT 2B)
3. % Weight Loss=Weight Loss×100/Initial Weight
4. Filter Paper Weight Gain=(WT 3A or WT 3B)−(WT 3)
5. Volatile Weight
   a. (Weight Loss)−(Filter Paper Weight Gain) if >0 or
   b. 0, if (Weight Loss)−(Filter Paper Weight Gain)≦0
6. % Volatile Weight=Volatile Weight×100/Initial Weight
7. % Nonvolatile Separation=% Weight Loss−% Volatile Weight "A" values are used to calculate weight change after 16 hours at room temperature. "B" values are used to determine weight change after the additional 24 hours at 65° C.

MEASUREMENT ERROR

Due to repeated handling of the sample, some error should be expected, especially in calculating volatile weight loss at room temperature. All weights should be recorded to the nearest 0.0001 gram. All calculated results should be reported to the nearest whole number. At least three samples should be tested simultaneously per compound to be evaluated. The resulting percentage values can then be averaged to determine the % Weight Loss and % Nonvolatile Separation.

The gelled oils produced by the invention are especially suited for use as filling compounds as well as buffer tube gelling agents. In addition, these compositions can be used as encapsulant or potting compounds to seal electrical or other water sensitive components from the introduction of moisture or water thereon. These compositions can be used in place of the soft polyurethane elastomers of the prior art for these applications. For example, the compositions of the invention can be introduced into the test ports of a terminal block for electrical connectors so as to form a moisture proof seal over the port. Moreover, electrical access to the test port can be achieved by piercing the gel with a probe. Other related uses for these compositions would be understandable to one skilled in the art.

We claim:

1. A gelled oil composition comprising about 40 to 90% of an oil component, about 4 to 15% of an aluminum soap complex, and about 5–50% of a bleed inhibitor comprising the combination of a synthetic oil selected from the group consisting polybutene, polyisoprene, polyhexene, polyheptene, polyoctene and polynonene and at least one styrene-rubber block copolymer.
2. The composition of claim 1 wherein said oil component is present in an amount of about 50–75%.
3. The composition of claim 2 wherein said bleed inhibitor is present in an amount of about 25–45%.
4. The composition of claim 3 wherein said aluminum soap complex is present in an amount of about 6–8%.
5. The composition of claim 1 wherein the aluminum soap complex comprises an aluminum salt of a fatty acid and an aromatic acid.
6. The composition of claim 5 wherein said fatty acid is at least one of stearic acid, capric acid, oleic acid, myristic acid, and palmitic acid.
7. The composition of claim 6 wherein said aromatic acid is at least one of benzoic acid, p-toluic acid, o-toluic acid, 2-chlorobenzoic acid, α-naphthoic acid, β-naphthoic acid, 9-phenanthroic acid, 3-phenanthroic acid, anthraquinone-α-carboxylic acid, anthraquinone-β-carboxylic acid, and dehydroabietic acid.
8. The composition of claim 7 wherein said oil component is a poly alpha olefin which has less than ten carbons.
9. The composition of claim 1 wherein the styrene-rubber block copolymer is present in an amount of about 0.5 to 10% by weight of the composition.
10. The composition of claim 9 wherein said styrene rubber block copolymer is employed with at least one of butyl rubber, ethylene-propylene rubber, ethylene-propylene dimer rubber, chlorinated rubber, or a thermoplastic rubber to form the block copolymer.
11. The composition of claim 1 wherein said synthetic oil is polybutene and said styrene-rubber block copolymer is a styrene-ethylene propylene block copolymer having a styrene:rubber ratio of about 0.37:0.63.
12. The composition of claim 1 further comprising at least one of a pour point depressant in an amount of between about 0.1 to 10% and an antioxidant in an amount of between about 0.1 to 2% by weight.
13. The composition of claim 12 wherein the antioxidant comprises a sterically hindered phenolic compound that includes a sulfur linkage.
14. The composition of claim 1 wherein the oil component has an aromatic content of less than 6%.

15. A buffer tube gel composition comprising about 20–90% of an oil component, about 5–50% of a bleed inhibitor comprising the combination of polybutene and at least one styrene-rubber block copolymer, and about 4–30% of an aluminum soap complex wherein the oil component and the bleed inhibitor are in the weight ratio of about 7:3–1:1.

16. The composition of claim 15 wherein the oil component is present in an amount of about 50–75%, the bleed inhibitor is present in an amount of about 25–45% and the aluminum soap complex is present in an amount of about 6–8%.

17. The composition of claim 15 wherein the aluminum soap complex is present in an amount of about 6–7%, said oil is present in an amount of about 54–56%, and said bleed inhibitor is present in an amount of about 34–36%.

18. The composition of claim 15 wherein the aluminum soap complex has a fatty acid to aromatic acid ratio of about 1:1.

19. The composition of claim 18 wherein the aluminum soap complex has total acids to aluminum ratio of about 2.

20. The composition of claim 19 wherein said oil component is food grade mineral oil.

21. The composition of claim 15 further comprising at least one of a pour point depressant in an amount of between about 0.5 to 10% and an antioxidant in an amount of between about 0.1 to 2% by weight.

22. The composition of claim 15 wherein said styrene-rubber block copolymer is a radial block polymer of the formula (styrene-rubber)$_n$, where n is 3–4.

23. The composition of claim 22 wherein the rubber in said styrene-rubber copolymer is selected from the group consisting of isoprene, butadiene, ethylene/propylene and mixtures thereof.

24. The composition of claim 22 wherein said styrene-rubber copolymer has a styrene:rubber ratio of about 1:9–1:1.

* * * * *